(12) United States Patent
Chiba

(10) Patent No.: US 9,501,554 B2
(45) Date of Patent: Nov. 22, 2016

(54) IMAGE PROCESSING SYSTEM, IMAGE PROCESSING METHOD, AND IMAGE PROCESSING PROGRAM

(71) Applicant: Rakuten, Inc., Tokyo (JP)

(72) Inventor: Naoki Chiba, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/767,997

(22) PCT Filed: Nov. 25, 2013

(86) PCT No.: PCT/JP2013/081636
§ 371 (c)(1),
(2) Date: Aug. 14, 2015

(87) PCT Pub. No.: WO2014/136327
PCT Pub. Date: Sep. 12, 2014

(65) Prior Publication Data
US 2015/0370889 A1    Dec. 24, 2015

(30) Foreign Application Priority Data

Mar. 6, 2013 (JP) ................................. 2013-044432

(51) Int. Cl.
G06K 9/32 (2006.01)
G06F 17/30 (2006.01)
G06K 9/62 (2006.01)
G06K 9/46 (2006.01)

(52) U.S. Cl.
CPC ... *G06F 17/30598* (2013.01); *G06F 17/30247* (2013.01); *G06F 17/30345* (2013.01); *G06K 9/325* (2013.01); *G06K 9/46* (2013.01); *G06K 9/6267* (2013.01); *G06K 9/6272* (2013.01); *G06K 2209/01* (2013.01)

(58) Field of Classification Search
CPC ..................... G06K 9/00456; G06K 9/00463; G06K 9/38; H04N 1/40062; G06T 7/0081; G06T 2207/30176; G06T 2207/20144; G06T 7/0083; G06T 2207/10016; G03B 15/02; G03B 15/05; G03B 15/06; G03B 15/03; F21W 2131/406
See application file for complete search history.

(56) References Cited

PUBLICATIONS

Communication from International Searching Authority issued Sep. 8, 2015 from Counterpart International Application No. PCT/JP2013/081636.
Y. Zhang, et al., "Locating Text in Complex Color Images," Pattern Recognition, vol. 28, No. 10, 1995, pp. 146-149.

*Primary Examiner* — Duy M Dang
(74) *Attorney, Agent, or Firm* — Sughrue Mion, PLLC

(57) ABSTRACT

An image processing system according to one embodiment includes a feature quantity calculation unit, a classification unit, a score calculation unit, and an output unit. The feature quantity calculation unit calculates a feature quantity for each of a plurality of candidate regions extracted as a candidate for a text region from a plurality of original sample images. The plurality of original sample images include one or more text images containing a text region and one or more non-text images not containing a text region. The classification unit classifies the plurality of candidate regions into a plurality of categories based on the feature quantity. The score calculation unit calculates, for each category, a score indicating a frequency of appearance of the candidate region to which an annotation indicating extraction from the text image is added. The output unit outputs the score of each category as category information.

19 Claims, 17 Drawing Sheets

*Fig.7*

NUMBER OF CATEGORIES=20

| CATEGORY ID | CATEGORY CENTER | | SCORE |
|---|---|---|---|
| | ASPECT RATIO | AREA RATIO | |
| C01 | ra1 | rb1 | 0.35 |
| C02 | ra2 | rb2 | 0.70 |
| ⋮ | ⋮ | ⋮ | ⋮ |
| C20 | ra20 | rb20 | 0.45 |

AVERAGE FREQUENCY OF APPEARANCE=0.57

Fig.15

IMAGE ATTRIBUTE=CAMERA
NUMBER OF CATEGORIES=15

| CATEGORY ID | CATEGORY CENTER | | SCORE |
| --- | --- | --- | --- |
| | ASPECT RATIO | AREA RATIO | |
| C1001 | .... | .... | .... |
| C1002 | .... | .... | .... |
| ⋮ | ⋮ | ⋮ | ⋮ |
| C1015 | .... | .... | .... |

AVERAGE FREQUENCY OF APPEARANCE=0.61

IMAGE PROCESSING SYSTEM, IMAGE PROCESSING METHOD, AND IMAGE PROCESSING PROGRAM

CROSS REFERENCE TO RELATED APPLICATIONS

This application is a National Stage of International Application No. PCT/JP2013/081636 filed Nov. 25, 2013, claiming priority based on Japanese Patent Application No. 2013-044432, filed Mar. 6, 2013, the contents of all of which are incorporated herein by reference in their entirety.

TECHNICAL FIELD

One aspect of the present invention relates to an image processing system, an image processing method, and an image processing program.

BACKGROUND ART

Techniques that extract a text region from an image have been known. For example, the technique that extracts regions of the same color and being connected as a text region is disclosed in Non Patent Literature 1 below. Another method is that, for a region where the same colors are connected, calculates an aspect ratio f1 of a circumscribing rectangle and a ratio f2 of the area of the same color region to the area of the circumscribing rectangle and determines a rectangular region having f1 and f2 in a specified range as a text region. Yet another method is line determination that determines a plurality of rectangular regions having such characteristics and continuously arranged in a line as a text region.

CITATION LIST

Patent Literature

NPL1: Y. Zhong, K. Karu, and A. K. Jain. "Locating text in complex color images," Pattern recognition, vol. 28, no. 10, pp. 1523-1535, 1995.

SUMMARY OF INVENTION

Technical Problem

However, in the above methods, there are cases where a part that is not actually a text region is detected as a text region and where a part that is actually a text region is not detected as a text region, and the accuracy of detection is not sufficiently high. For example, in the technique that detects a rectangular region where the two ratios f1 and f2 are in a specified range as a text region, there is a case where text is not actually present in the rectangular region where those ratios are within the specified range. It is thus desired to more accurately detect a text region in an image.

Solution to Problem

An image processing system according to one aspect of the present invention includes a feature quantity calculation unit configured to calculate a feature quantity for each of a plurality of candidate regions extracted as a candidate for a text region from a plurality of original sample images, the plurality of original sample images including one or more text images containing a text region and including one or more non-text images not containing a text region, a classification unit configured to classify the plurality of candidate regions into a plurality of categories based on the feature quantity, an annotation indicating which of the text image and the non-text image the candidate region is extracted from being added to each candidate region, a score calculation unit configured to calculate, for each category, a score indicating a frequency of appearance of the candidate region to which the annotation indicating extraction from the text image is added, and an output unit configured to output the score of each category as category information.

An image processing method according to one aspect of the present invention includes a feature quantity calculation step of calculating a feature quantity for each of a plurality of candidate regions extracted as a candidate for a text region from a plurality of original sample images, the plurality of original sample images including one or more text images containing a text region and including one or more non-text images not containing a text region, a classification step of classifying the plurality of candidate regions into a plurality of categories based on the feature quantity, an annotation indicating which of the text image and the non-text image the candidate region is extracted from being added to each candidate region, a score calculation step of calculating, for each category, a score indicating a frequency of appearance of the candidate region to which the annotation indicating extraction from the text image is added, and an output step of outputting the score of each category as category information.

An image processing program according to one aspect of the present invention causes a computer to function as a feature quantity calculation unit configured to calculate a feature quantity for each of a plurality of candidate regions extracted as a candidate for a text region from a plurality of original sample images, the plurality of original sample images including one or more text images containing a text region and including one or more non-text images not containing a text region, a classification unit configured to classify the plurality of candidate regions into a plurality of categories based on the feature quantity, an annotation indicating which of the text image and the non-text image the candidate region is extracted from being added to each candidate region, a score calculation unit configured to calculate, for each category, a score indicating a frequency of appearance of the candidate region to which the annotation indicating extraction from the text image is added, and an output unit configured to output the score of each category as category information.

A computer-readable recording medium according to one aspect of the present invention stores an image processing program that causes a computer to function as a feature quantity calculation unit configured to calculate a feature quantity for each of a plurality of candidate regions extracted as a candidate for a text region from a plurality of original sample images, the plurality of original sample images including one or more text images containing a text region and including one or more non-text images not containing a text region, a classification unit configured to classify the plurality of candidate regions into a plurality of categories based on the feature quantity, an annotation indicating which of the text image and the non-text image the candidate region is extracted from being added to each candidate region, a score calculation unit configured to calculate, for each category, a score indicating a frequency of appearance of the candidate region to which the annotation indicating extraction from the text image is added, and an output unit configured to output the score of each category as category information.

According to the above aspects, for each of a plurality of categories classified based on feature quantities, the frequency of appearance of candidate regions detected from a text image is calculated as a score and output. Because the probability of appearance of text in each category is thereby obtained, it is possible to more accurately detect a text region in an image by using this detailed result.

An image processing system according to one aspect of the present invention includes a feature quantity calculation unit configured to calculate a feature quantity for each of a plurality of candidate regions extracted as a candidate for a text region from at least one original sample image, a classification unit configured to classify the plurality of candidate regions into a plurality of categories based on the feature quantity, an annotation indicating whether the candidate region is a text region being added to each candidate region, a score calculation unit configured to calculate, for each category, a score indicating a frequency of appearance of the candidate region to which the annotation indicating the text region is added, and an output unit configured to output the score of each category as category information.

An image processing method according to one aspect of the present invention includes a feature quantity calculation step of calculating a feature quantity for each of a plurality of candidate regions extracted as a candidate for a text region from at least one original sample image, a classification step of classifying the plurality of candidate regions into a plurality of categories based on the feature quantity, an annotation indicating whether the candidate region is a text region being added to each candidate region, a score calculation step of calculating, for each category, a score indicating a frequency of appearance of the candidate region to which the annotation indicating the text region is added, and an output step of outputting the score of each category as category information.

An image processing program according to one aspect of the present invention causes a computer to function as a feature quantity calculation unit configured to calculate a feature quantity for each of a plurality of candidate regions extracted as a candidate for a text region from at least one original sample image, a classification unit configured to classify the plurality of candidate regions into a plurality of categories based on the feature quantity, an annotation indicating whether the candidate region is a text region being added to each candidate region, a score calculation unit configured to calculate, for each category, a score indicating a frequency of appearance of the candidate region to which the annotation indicating the text region is added, and an output unit configured to output the score of each category as category information.

A computer-readable recording medium according to one aspect of the present invention stores an image processing program that causes a computer to function as a feature quantity calculation unit configured to calculate a feature quantity for each of a plurality of candidate regions extracted as a candidate for a text region from at least one original sample image, a classification unit configured to classify the plurality of candidate regions into a plurality of categories based on the feature quantity, an annotation indicating whether the candidate region is a text region being added to each candidate region, a score calculation unit configured to calculate, for each category, a score indicating a frequency of appearance of the candidate region to which the annotation indicating the text region is added, and an output unit configured to output the score of each category as category information.

According to the above aspects, for each of a plurality of categories classified based on feature quantities, the frequency of appearance of candidate regions specified as a text region is calculated as a score and output. Because the probability of appearance of text in each category is thereby obtained, it is possible to more accurately detect a text region in an image by using this detailed result.

In the image processing system according to another aspect, the score calculation unit may calculate a proportion of the number of candidate regions extracted from the text image in one category as the score.

In the image processing system according to another aspect, the classification unit may further reclassify the candidate regions included in the category including candidate regions extracted from the text image and candidate regions extracted from the non-text image into a plurality of categories, and the score calculation unit may calculate a proportion of the number of candidate regions extracted from the text image as the score, for each of the plurality of categories generated by the reclassification.

In the image processing system according to another aspect, the annotation may be added to each of the original sample images, and the feature quantity calculation unit may add the annotation added to the original sample image from which the candidate region is extracted, to the candidate region.

In the image processing system according to another aspect, the score calculation unit may calculate a proportion of the number of candidate regions to which the annotation indicating the text region is added in one category as the score.

In the image processing system according to another aspect, the classification unit may further reclassify the candidate regions included in the category including candidate regions to which the annotation indicating the text region is added and candidate regions to which the annotation indicating the text region is not added, into a plurality of categories, and the score calculation unit may calculate a proportion of the number of candidate regions to which the annotation indicating the text region is added as the score, for each of the plurality of categories generated by the reclassification.

In the image processing system according to another aspect, the classification unit may set a plurality of category centers based on the feature quantity and associate the candidate region with the category where a distance between the feature quantity of the candidate region and the category center is shortest.

In the image processing system according to another aspect, the feature quantity may be an aspect ratio of the candidate region and an area ratio of a part determined as the text region.

In the image processing system according to another aspect, an additional attribute indicating a genre of a subject or a provider of the original sample image may be associated with each original sample image, the feature quantity calculation unit, the classification unit and the score calculation unit may sort the plurality of original sample images into groups based on the additional attribute and perform processing for each group, and the output unit may output the category information of each group.

The image processing system according to another aspect may further include a determination unit configured to determine, based on the category information, whether an original target image being a processing target contains a text region.

In the image processing system according to another aspect, the determination unit may calculate the feature quantity for each of a plurality of candidate regions extracted from the original target image containing the processing target, specify the category to which each candidate region belongs, and determine whether the original target image contains a text region based on a highest score among a plurality of scores corresponding to the plurality of candidate regions.

The image processing system according to another aspect may further include a determination unit configured to determine, based on the category information, whether the candidate region extracted as a candidate for a text region from a processing target image is a text region.

In the image processing system according to another aspect, the determination unit may calculate the feature quantity for each of a plurality of candidate regions extracted from the original target image containing the processing target, specify the category to which each candidate region belongs, and determine, for each candidate region, whether the candidate region is a text region based on a score corresponding to the candidate region.

The image processing system according to another aspect may further include a determination unit configured to determine whether a processing target having the additional attribute contains a text region based on the category information corresponding to the additional attribute.

Advantageous Effects of Invention

According to one aspect of the present invention, it is possible to more accurately detect a text region in an image.

BRIEF DESCRIPTION OF DRAWINGS

FIG. 7 is a view showing an example of category information.

FIG. 15 is a view showing an example of category information according to an alternative example.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

The functions and configuration of an image processing system 1 according to an embodiment are described hereinafter with reference to FIGS. 1 to 7. The image processing system 1 is a computer system for determining whether text is drawn in an image or not. For example, the image processing system 1 can be applied to determination of a large amount of product images that are used in a virtual shopping mall which sells a large variety of products. Note that "text" in this specification is the concept including a mark or the like of a certain shape.

Figure 1:
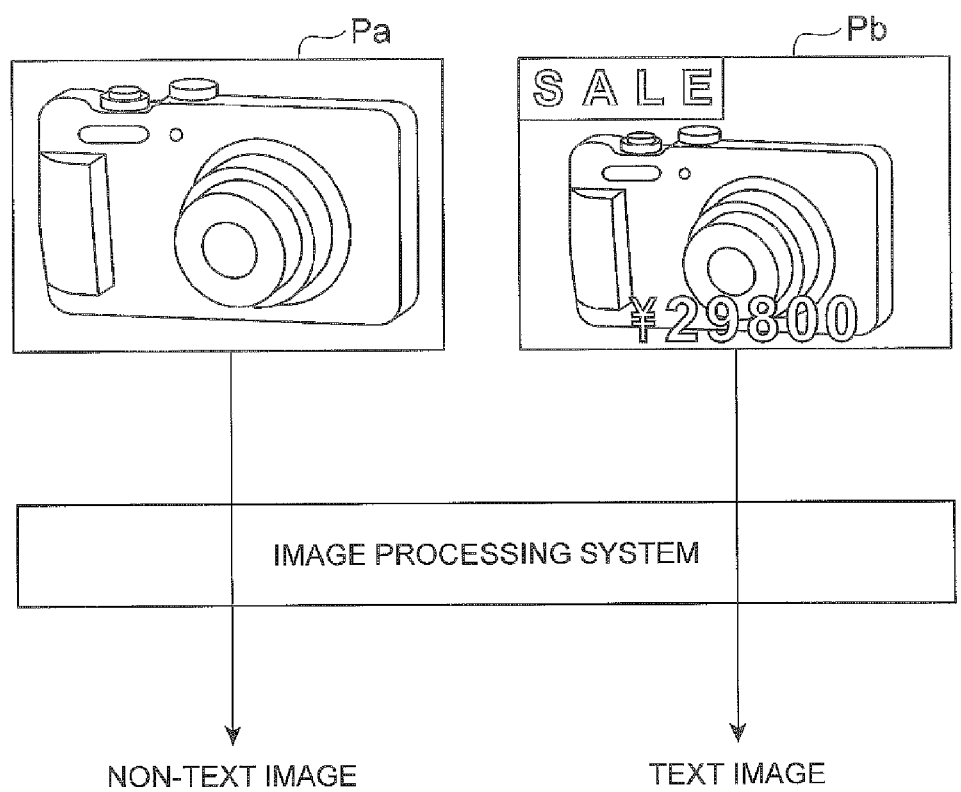
FIG. 1 is a view showing the concept of an image processing system according to an embodiment.

In general, product images used in a virtual shopping mall include images (product pictures) Pa in which only a product is shown and images Pb in which text is superimposed on product pictures (see FIG. 1). Examples of the text in the product pictures are a sales message such as "free shipping", a price, a shop name and the like. The text may be inserted by image editing software or photographed together with a main subject.

There are cases where an administrator of a virtual shopping mall wants to use only images in which text is not drawn or photographed (which are referred to as "non-text images" in this specification), eliminating images in which text is drawn or photographed (which are referred to as "text images" in this specification). For example, when an administrator wants to show the sales price at each of virtual shops for one product on a web page, it is desirable to use a non-text image (for example, an image showing the product only) as a representative image of the product.

To meet such a demand, the image processing system 1 automatically sorts images into non-text images and text images as shown in FIG. 1. The automatic sorting is made by two types of processing: learning and detection. For such processing, the image processing system 1 includes a learning device 10, a detection device 20, and a category database 30. The overview of those two types of processing is described first.

Figure 2:
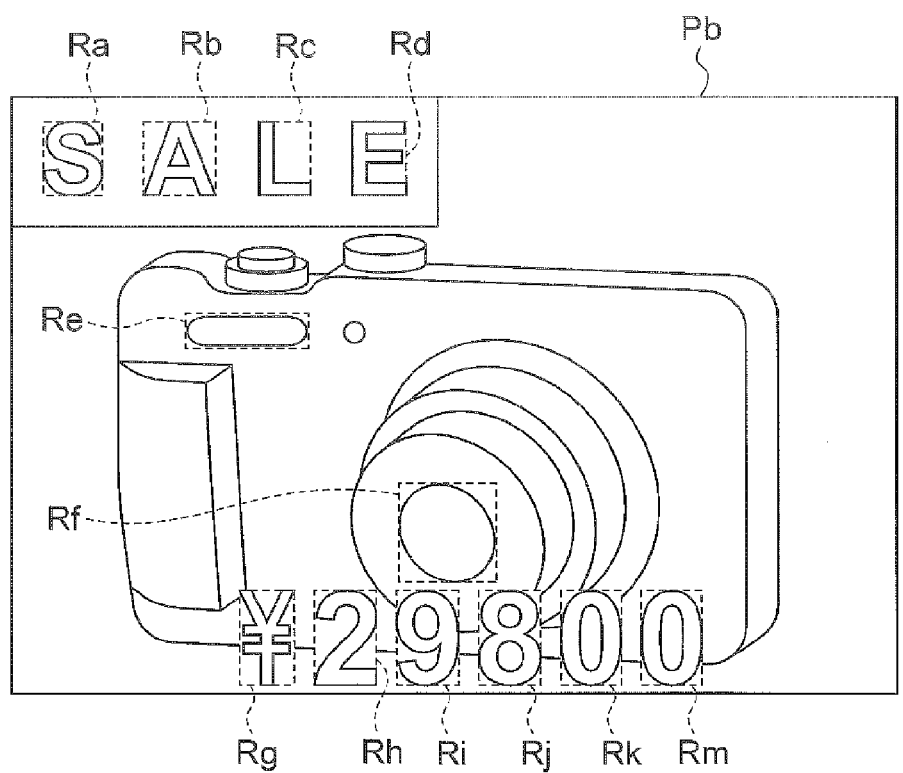
FIG. 2 is a view showing an example of an extracted candidate region.

The first phase is learning processing. In this processing, a plurality of original sample images to which an annotation indicating whether the image is a text image or a non-text image is manually added are used as input data. The learning device 10 performs color processing on each of the original sample images and thereby extracts candidate regions from the original sample image. The candidate region is a part of the original sample image which is estimated that text is drawn or photographed therein. As an example, FIG. 2 shows candidate regions Ra to Rm. As the candidate regions Re and Rf in this example, a part that is not actually text can be extracted as the candidate region. Then, the learning device 10 classifies a plurality of candidate regions into a plurality of categories based on feature quantities of each candidate region. Then, the learning device 10 calculates a score of each category, a threshold for determination or the like and stores the calculation results as category information into the category database 30.

The second phase is detection processing. Data for which the detection processing is performed (processing target) is the whole or a part of an image. The detection device 20 performs the same color processing as in the learning processing and thereby extracts candidate regions, associates each candidate region with any category and sets a score. Then, the detection device 20 compares a threshold obtained in the learning processing and the score of the candidate region and thereby determines whether the processing target contains text or not. Note that, in this specification, "the whole or a part of an image contains text" means that text is drawn or photographed in the whole or a part of an image.

Figure 3:
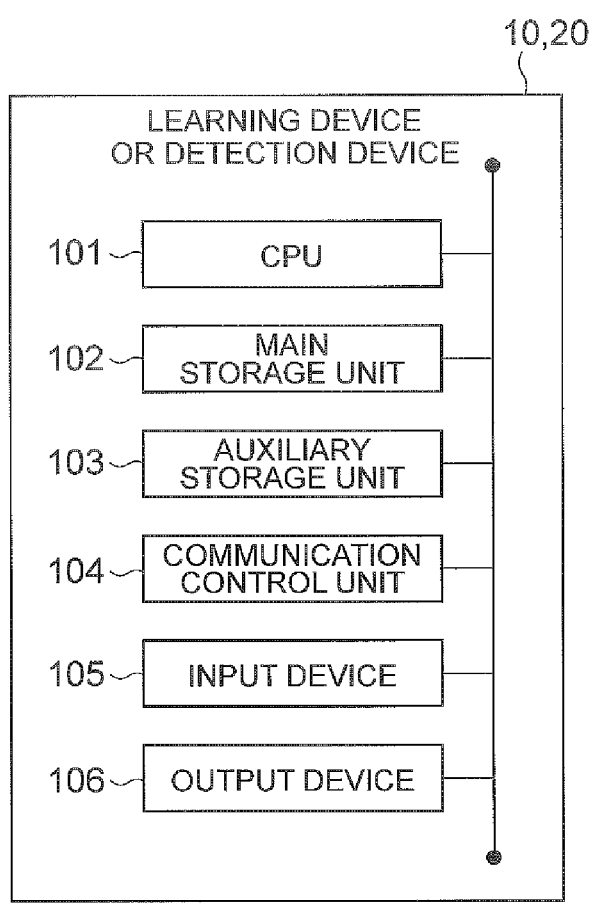
FIG. 3 is a view showing a hardware configuration of an image processing system (each device) according to the embodiment.

FIG. 3 shows a hardware configuration of the learning device 10 and the detection device 20. Each of the learning device 10 and the detection device 20 includes a CPU 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a display.

The functional elements of the learning device 10 and the detection device 20, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and databases required for processing are stored in the main storage unit 102 or the auxiliary storage unit 103.

Note that each of the learning device 10 and the detection device 20 may be composed of one computer or may be composed of a plurality of computers.

Hereinafter, the functional configurations of the two types of devices are described, and the learning processing and the detection processing are described in detail.

Figure 4:
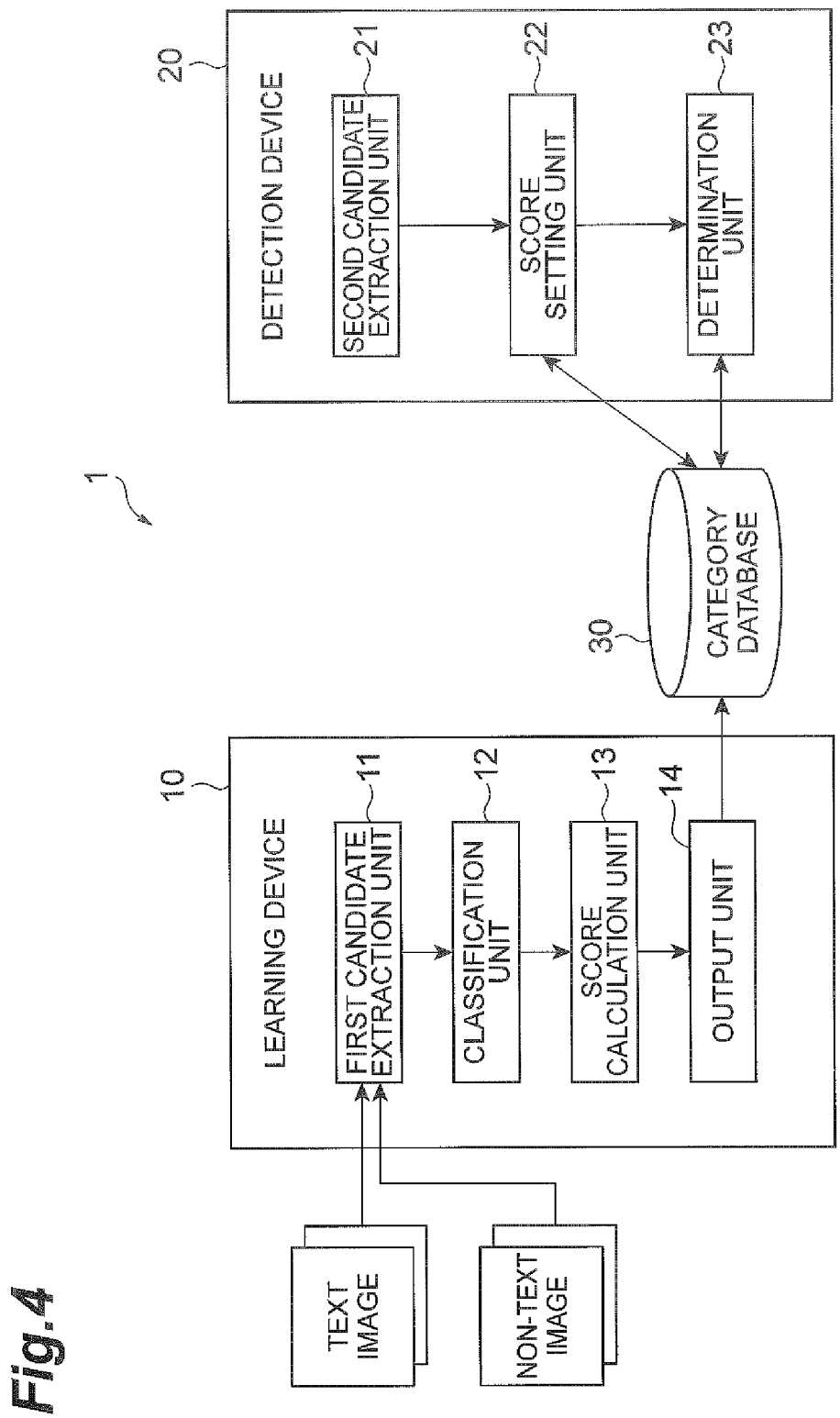
FIG. 4 is a block diagram showing a functional configuration of the image processing system according to the embodiment.

The learning device 10 is described first. As shown in FIG. 4, the learning device 10 includes, as functional elements, a first candidate extraction unit (feature quantity calculation unit) 11, a classification unit 12, a score calculation unit 13, and an output unit 14.

The first candidate extraction unit 11 is a functional element that extracts a plurality of candidate regions from a plurality of original sample images and calculates a feature quantity for each of the candidate regions. The original sample image is product image data collected for the learning processing. A group of original sample images is made up of one or more text images and one or more non-text images. An annotation indicating whether the image is a text image or a non-text image is manually associated with the original sample image. The addition of an annotation is the work that gives a correct answer to the image processing system 1 in advance.

The first candidate extraction unit 11 performs the following processing on one original sample image.

First, the first candidate extraction unit 11 performs color processing on one original sample image and thereby extracts candidate regions from the original sample image. In this embodiment, the shape of each candidate region is a circumscribing quadrangle (circumscribing rectangle or circumscribing square) that surrounds a region that is estimated as text.

A specific technique of the color processing is not limited. For example, the first candidate extraction unit 11 may extract candidate regions by using color clustering, which is one type of the region-based approach. According to this technique, the first candidate extraction unit 11 reduces the number of colors by using the k-means method for clustering and, after clustering, divides a region for each color cluster based on topology analysis. In other words, the first candidate extraction unit 11 extracts a region that is substantially uniform in color and is continuous as a candidate region.

The first candidate extraction unit 11 may calculate an aspect ratio f1 and an area ratio (region ratio) f2, which are described later, for a circumscribing quadrangle circumscribing a region that is substantially uniform in color and is continuous, and determines the region where the aspect ratio f1 and the area ratio f2 are within a predetermined range as a candidate region. In this case, the predetermined range for the aspect ratio f1 and the area ratio f2 is set to exclude a region having a feature quantity which a text region never has.

In order to reduce wrong detection of a candidate region in the case of using the region-based approach, the first candidate extraction unit 11 may use Histogram of Oriented Gradient (HOG). HOG is a technique that utilizes the characteristics that, for a pair of edge pixels that form a text width, the slope of the edge of the both is the same but the orientation of each edge is opposed to each other.

Alternatively, the first candidate extraction unit 11 may extract candidate regions by using the classifier-based approach, such as support vector machine (SVM), for example. Alternatively, the first candidate extraction unit 11 may extract candidate regions by performing postprocessing by the classifier-based approach after using the region-based approach.

Figure 5:
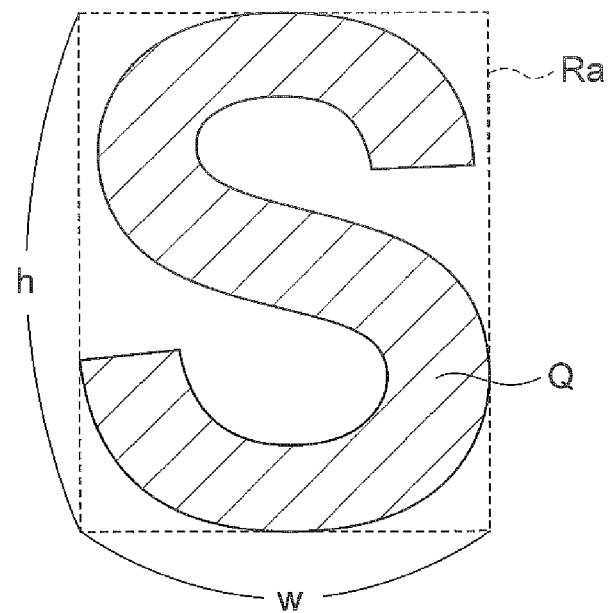
FIG. 5 is a view illustrating a feature quantity of a candidate region.

After detecting candidate regions, the first candidate extraction unit 11 calculates two feature quantities for each candidate region. One is the aspect ratio f1 of the circumscribing quadrangle. The other one is the ratio (area ratio) f2 of the area of a part determined as a text region (the number of pixels of the text region) to the area of the circumscribing quadrangle (the total number of pixels of the circumscribing quadrangle), which is referred to as "area ratio" in this specification. In the example of FIG. 5, the aspect ratio is obtained from the height h and the width w of the circumscribing quadrangle Ra. Further, the area ratio is obtained from the area (the number of pixels) of the circumscribing quadrangle Ra and the area (the number of pixels) of a text part (hatched part) Q.

The first candidate extraction unit 11 performs extraction of candidate regions and calculation of two feature quantities f1 and f2 of each candidate region for all of the original sample images. Then, the first candidate extraction unit 11 outputs information for each candidate region to the classification unit 12. Information for one candidate region contains a region ID that uniquely specifies the candidate region, an annotation of the original sample image from which the candidate region is extracted, the aspect ratio f1, and the area ratio f2. Thus, by referring to the information for each candidate region, it is possible to know which of a text image and a non-text image the candidate region is extracted from.

The classification unit 12 is a functional element that classifies a plurality of candidate regions into a plurality of categories based on feature quantities. This processing is, in other words, region clustering.

Because the range or the measure of values are different between the aspect ratio f1 and the area ratio f2, the classification unit 12 first normalizes each of the two types of feature quantities. Although a method of normalization is not limited, the classification unit 12 performs normalization using a covariance matrix of the feature quantity in this embodiment. The classification unit 12 calculates a covariance matrix Σ from a matrix (column vector) X where the feature quantity is in a column and the number of extracted data (specifically, the number of candidate regions) is the number of rows. Then, the classification unit 12 normalizes the feature quantity of each candidate region by the following equation (1) using the covariance matrix Σ. The matrix X* in the equation (1) is the normalized matrix. The classification unit 12 performs this normalization for each of the aspect ratio f1 and the area ratio f2.

$$X^* = X\Sigma^{\frac{1}{2}} \tag{1}$$

After that, the classification unit 12 classifies a plurality of candidate regions into a plurality of categories based on the two normalized feature quantities f1 and f2, by using the k-means method. Because an ideal number of categories is unknown, the classification unit 12 repeats clustering with the number of categories gradually increasing, and ceases to increase the number of categories at the point when the diminution of errors becomes less than a specified value or errors increase. The initial value of the number of categories is 2, for example.

Figure 6:
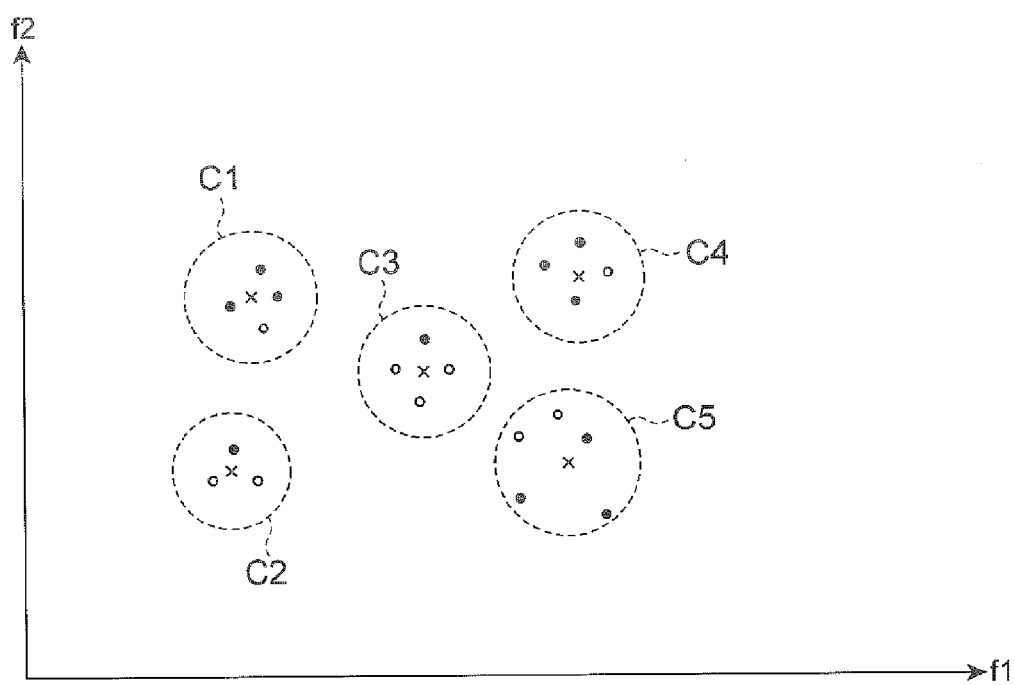
FIG. 6 is a view showing the concept of classification (clustering) of candidate regions.

The concept of such processing of the classification unit 12 is described hereinafter with reference to FIG. 6. FIG. 6 is a graph where candidate regions are plotted in a two-dimensional coordinate system having two feature quantities f1 and f2 as the coordinate axes. The black circle indicates a candidate region that is extracted from a text image, and the white circle indicates a candidate region that is extracted from a non-text image. The regions C1 to C5 on the graph indicate categories. This graph shows that the classification unit 12 has classified a plurality of candidate regions into five categories C1 to C5. The classification unit 12 calculates the Mahalanobis distance between the category center (which corresponds to the center of each region and is indicated by "x" in FIG. 6) of each category and one candidate region, and make the candidate region belong to the category where the distance is the shortest.

Note that the shape of a category in the two-dimensional coordinate system is not limited to a circle. Because the range covered by one category varies, a category in the two-dimensional coordinate system can be represented by a figure other than a circle.

After performing the region clustering, the classification unit 12 performs association between candidate regions and categories to which they belong, and outputs information of each candidate region with which a category is associated to the score calculation unit 13. Further, the classification unit 12 also outputs data of the category center (the feature quantity f1, f2 corresponding to the center of each circle in FIG. 6) of each category to the score calculation unit 13. The category center is a representative feature quantity of each category.

The score calculation unit 13 is a functional element that calculates, for each category, a score indicating the frequency of appearance of a candidate region extracted from a text image. This score is an index indicating the probability that a candidate region belonging to a category contains text.

The score calculation unit 13 calculates the score of each category by using the following equation (2). The score P(Cn) represents the score of the n-th category Cn.

$$P(Cn)=t/a \tag{2}$$

The variable t is the number of candidate regions belonging to the category Cn and extracted from a text image. The variable a is the total number of candidate regions belonging to the category Cn, which is the sum of the number of candidate regions extracted from a text image and the number of candidate regions extracted from a non-text image. Accordingly, the score P(Cn) is the proportion of the number of candidate regions extracted from a text image to the total number of candidate regions belonging to the category Cn. Thus, in this embodiment, the frequency of appearance is represented by the proportion.

The scores of the categories C1 to C5 shown in FIG. 6 are as follows.

$C1=3/4=0.75$ $C2=1/3 \approx 0.33$ $C3=1/4=0.25$ $C4=3/4=0.75$ $C5=3/5=0.60$

Further, the score calculation unit 13 calculates the average of frequency of appearance of candidate regions belonging to a text image (average frequency of appearance) P(T) by the following equation (3).

$$P(T)=t_a/N$$

The variable $t_a$ is the total number of candidate regions extracted from all text images, and N is the total number of candidate regions extracted from all original sample images (all text images and non-text images).

In the example of FIG. 6, P(T)=(3+1+1+3+3)/(4+3+4+4+5)=11/20=0.55.

The score calculation unit 13 outputs the score P(Cn) of each category Cn and the average frequency of appearance P(T) to the output unit 14.

The output unit 14 is a functional element that stores category information into the category database 30. The category information is used by the detection device 20. To be specific, the output unit 14 stores the following four kinds of data as the category information into the category database 30.

The number of categories

The category center of each category (the representative feature quantity of each of the aspect ratio and the area ratio)

The score P(Cn) of each category

The average frequency of appearance P(T)

FIG. 7 shows an example of the category information. In this example, the number of categories is 20. For each of the 20 categories, a category ID that uniquely identifies a category, a category center, and a score are associated with one another. Further, the average frequency of appearance is also stored.

Note that the logical structure and the physical structure of the category database 30 are not limited. For example, the category database 30 may be present as a data file or present as a relational database.

The detection device 20 is described hereinafter. As shown in FIG. 4, the detection device 20 includes, as functional elements, a second candidate extraction unit 21, a score setting unit 22, and a determination unit 23. In CLAIMS at the time of filing the present application, those functional elements are collectively referred to as "determination unit".

The second candidate extraction unit 21 is a functional element that receives one original target image, extracts candidate regions from the original target image, and calculates a feature quantity for each candidate region. The original target image is product image data collected as a target of the detection processing, and it is an image with no annotation. The second candidate extraction unit 21 performs extraction of candidate regions and calculation of feature quantities (the aspect ratio f1 and the area ratio f2) of each candidate region by using the same technique as in the first candidate extraction unit 11 of the learning device 10. Then, the second candidate extraction unit 21 outputs information of each extracted candidate region to the score setting unit 22.

The score setting unit 22 is a functional element that sets a score to an input candidate region. The score setting unit 22 normalizes the feature quantities f1 and f2 of each candidate region in the same technique as the classification unit 12 of the learning device 10 and then performs the following processing for each candidate region.

The score setting unit 22 selects a category in which the Mahalanobis distance from a candidate region is the shortest based on the feature quantities f1 and f2 of one candidate region and the category center of each category read from the category database 30. Then, the score setting unit 22 sets the score P(Cn) of the selected category to the candidate region. When calculating the Mahalanobis distance, the score setting unit 22 normalizes the feature quantities f1 and f2 by using the square root of the covariance matrix Σ used in the process of learning. The learning device 10 stores the square root of the covariance matrix Σ calculated in the process of learning in a database.

This is described using the two-dimensional coordinate system in FIG. 6 as an example. For example, when the category C3 is selected for a certain candidate region, 0.25 is set to the candidate region, and when the category C4 is selected, 0.75 is set to the candidate region.

After setting the score for each candidate region, the score setting unit 22 outputs the information to the determination unit 23.

The determination unit 23 is a functional element that determines whether a processing target is a text image or a non-text image. In this embodiment, the processing target is an original target image itself. First, the determination unit 23 reads the average frequency of appearance P(T) from the category database 30. Next, the determination unit 23 compares the maximum value among the scores of the respective candidate regions with the average frequency of appearance. When the maximum score is equal to or more than the average frequency of appearance, the determination unit 23 determines that the processing target is a text image. On the other hand, when the maximum score is less than the average frequency of appearance, the determination unit 23 determines that the processing target is a non-text image.

Based on the category information shown in FIG. 7, when the maximum score is 0.50, the determination unit 23 determines that the original target image is a non-text image.

When the maximum score is 0.58, the determination unit 23 determines that the original target image is a text image Finally, the determination unit 23 outputs a determination result. The way of output is not limited, and the determination unit 23 may display the determination result on a monitor, output it to a printer, or store it into an arbitrary database.

Figure 8:
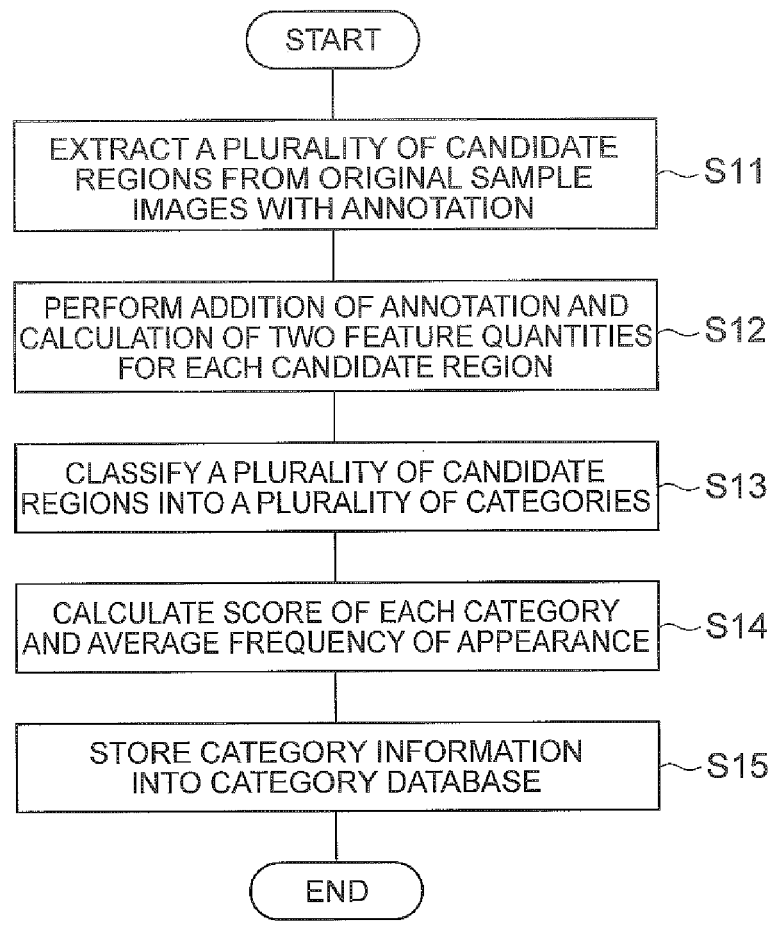
FIG. 8 is a flowchart showing an operation of the image processing system (learning device) according to the embodiment.
Figure 9:
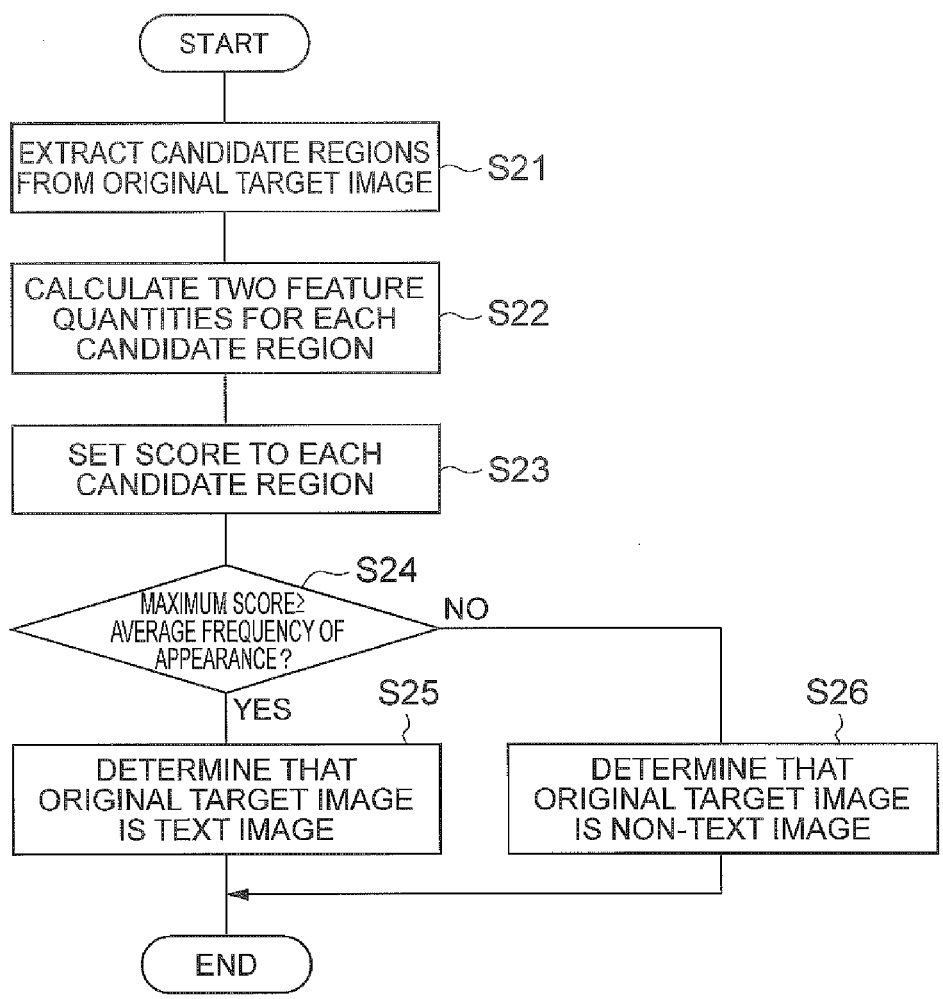
FIG. 9 is a flowchart showing an operation of the image processing system (detection device) according to the embodiment.

The operation of the image processing system 1 is described, and further an image processing method according to this embodiment is described hereinafter with reference to FIGS. 8 and 9.

First, the operation of the learning device 10 is described with reference to FIG. 8. In this embodiment, a user adds an annotation to each of original sample images in advance. Based on this assumption, the first candidate extraction unit 11 first performs color processing of each of the original sample images and thereby extracts a plurality of candidate regions (Step S11). Next, the first candidate extraction unit 11 performs, for each candidate region, addition of an annotation added to the original sample image and calculation of the two feature quantities f1 and f2 (Step S12, feature quantity calculation step).

Then, the classification unit 12 classifies a plurality of candidate regions into a plurality of categories based on the feature quantities f1 and f2 (Step S13, classification step). In this processing, the classification unit 12 obtains the category center of each category. Then, the score calculation unit 13 calculates the score P(Cn) of each category and the overall average frequency of appearance P(T) (Step S14, score calculation step). The output unit 14 then stores the category information (the number of categories, the category center and the score P(Cn) of each category, and the average frequency of appearance P(T)) into the category database 30 (Step S15, output step).

Next, the operation of the detection device 20 is described with reference to FIG. 9. First, the second candidate extraction unit 21 extracts candidate regions from an original target image (Step S21). Next, the second candidate extraction unit 21 performs processing of calculating the two feature quantities on each of the candidate regions (Step S22). Then, the score setting unit 22 sets the score P(Cn) to each candidate region based on the feature quantities of each candidate region and the category information in the category database 30 (Step S23). After that, when the maximum value of the set score is equal to or more than the average frequency of appearance P(T) (YES in Step S24), the determination unit 23 determines that the original target image is a text image (Step S25), and when the maximum value is less than the average frequency of appearance P(T) (NO in Step S24), the determination unit 23 determines that the original target image is a non-text image (Step S26). When there are a plurality of original target images, the detection device 20 performs the series of processing steps for each of the original target images.

Figure 10:
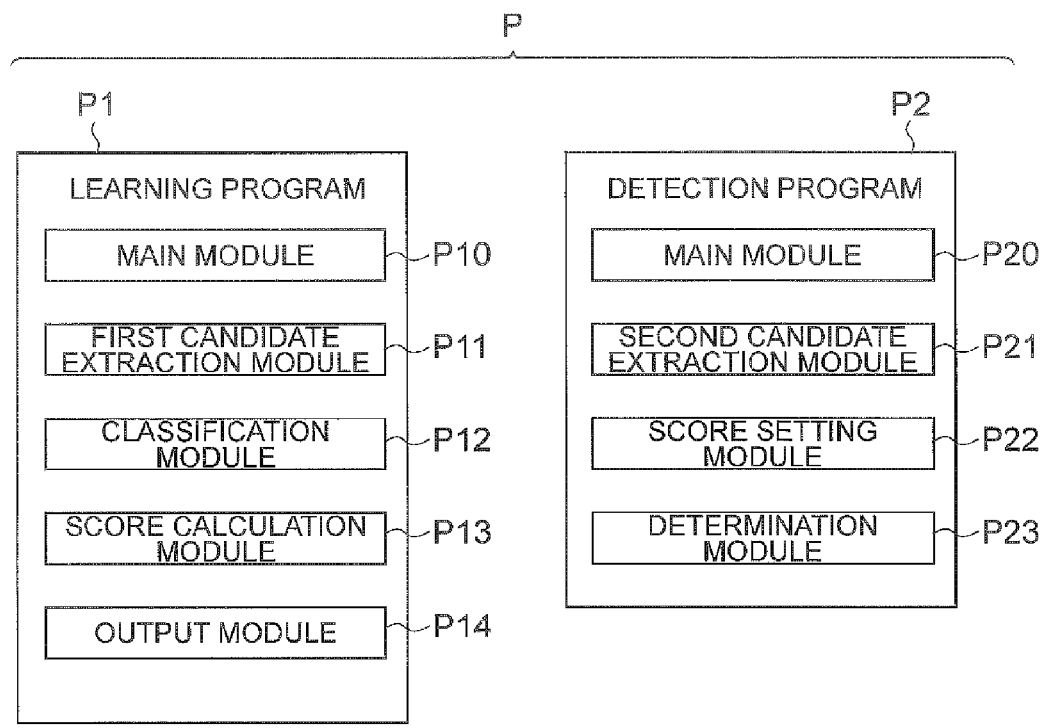
FIG. 10 is a view showing a configuration of an image processing program according to the embodiment.

An image processing program P for implementing the image processing system 1 is described hereinafter with reference to FIG. 10. The program P includes a learning program P1 that causes a computer to function as the learning device 10 and a detection program P2 that causes a computer to function as the detection device 20.

The learning program P1 includes a main module P10, a first candidate extraction module P11, a classification module P12, a score calculation module P13, and an output module P14.

The main module P10 is a part that exercises control over the functions of the learning device 10. The functions implemented by executing the first candidate extraction module P11, the classification module P12, the score calculation module P13 and the output module P14 are equal to the functions of the first candidate extraction unit 11, the classification unit 12, the score calculation unit 13 and the output unit 14 described above, respectively.

The detection program P2 includes a main module P20, a second candidate extraction module P21, a score setting module P22, and a determination module P23.

The main module P20 is a part that exercises control over the functions of the detection device 20. The functions implemented by executing the second candidate extraction module P21, the score setting module P22 and the determination module P23 are equal to the functions of the second candidate extraction unit 21, the score setting unit 22 and the determination unit 23 described above, respectively.

Each of the learning program P1 and the detection program P2 may be provided in the form of being recorded in a static manner on a tangible recording medium such as CD-ROM or DVD-ROM or semiconductor memory, for example. Further, each of the programs P1 and P2 may be provided as a data signal superimposed onto a carrier wave through a communication network.

As described above, according to this embodiment, for each of a plurality of categories classified based on the aspect ratio and the area ratio, the frequency of appearance of candidate regions detected from a text image is calculated as a score and output. Because the probability of appearance of text in each category is thereby obtained, it is possible to more accurately detect a text region in an image by using this detailed result.

Figure 11:
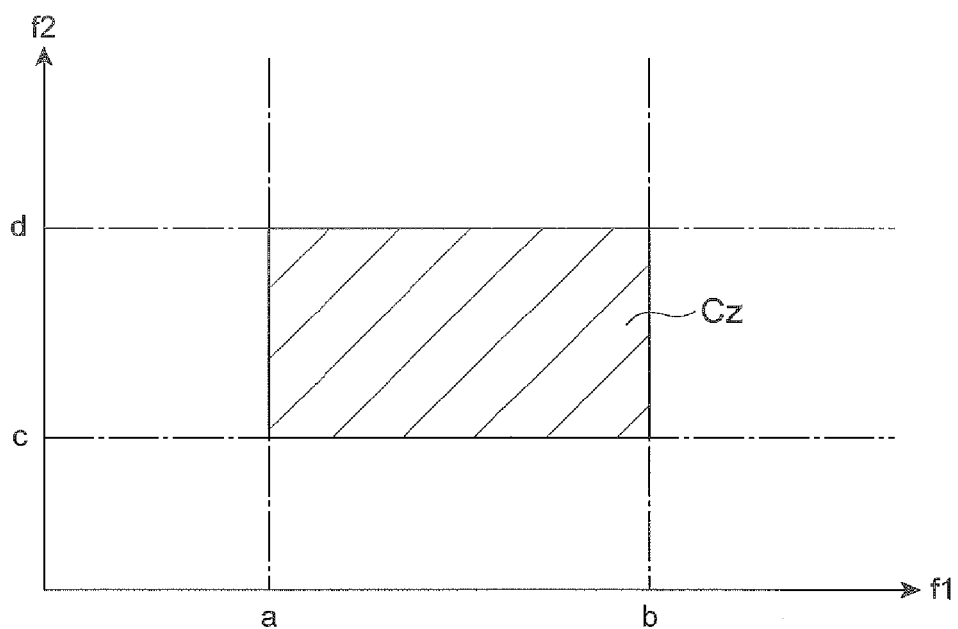
FIG. 11 is a view showing the concept of classification of candidate regions according to related art.

In the case of using the two feature quantities f1 and f2 in the technique according to related art, only one category Cz is set that is determined by one section [a, b] set for the aspect ratio f1 and one section [c, d] set for the area ratio f2, as shown in FIG. 11. Then, a candidate region that is located in the category Cz is determined as a text region. Therefore, the accuracy of determination as to whether a candidate region is a text region or not is low.

On the other hand, in the image processing system 1, a plurality of categories are set as shown in FIG. 6, and the score P(Cn) is set for each category. Accordingly, it is possible to perform determination as to whether a candidate region is a text region or not in more detail than in the technique according to related art shown in FIG. 11.

The advantageous effects are described more specifically below. Because the candidate regions Ra to Rd ("S", "A", "L" and "E") which are text regions and the candidate regions Re and Rf which are not text regions in FIG. 2 are different in feature quantities, they are likely to be classified into different categories. The candidate regions Ra to Rd which are text regions appear in a text image and do not appear in a non-text image. The candidate regions Re and Rf which are not text regions appear in both of a text image and a non-text image. Therefore, the frequency of appearance of the categories to which the candidate regions Ra to Rd which are text regions belong are relatively high, and the frequency of appearance of the categories to which the candidate regions Re and Rf which are not text regions belong are relatively low. Accordingly, the accuracy increases by determining whether it is a text image or not based on the frequency of appearance of each category.

One example of an experimental result indicating the advantage of the present invention is described hereinafter. In this experiment, 500 images were randomly extracted from Web pages of an electronic commerce site, and those images were separated into two groups (a first group and a second group) each containing 250 images. All of the images were pictures of products available on the site, and at least some of those contained a text region in which text such as a sales message, a price, a shop name and the like is drawn.

The example is as follows. First, an annotation was manually added to each original image in the first group, and the learning processing was performed using those original images, thereby generating a category database. Using this database, the detection processing was performed on each original image in the second group, and from this processing result, recall, precision and accuracy were calculated.

On the other hand, in the comparative example, recall, precision and accuracy were calculated using the technique according to related art that makes determination between a text image and a non-text image based on the positional relationship between the feature quantities of extracted candidate regions and the only category Cz described above.

The recall is the proportion of the images determined as text images in the detection processing to the actual text images. The precision is the proportion of the candidate regions actually containing text to the candidate regions detected as text images. The accuracy is the proportion of the images correctly determined as a text image or a non-text image.

Then, cross-validation was performed by performing the same processing after replacing the first group and the second group with each other for both of the example and the comparative example. Then, the average values of two calculation results were obtained for each of the recall, the precision and the accuracy as final results.

Figure 12:
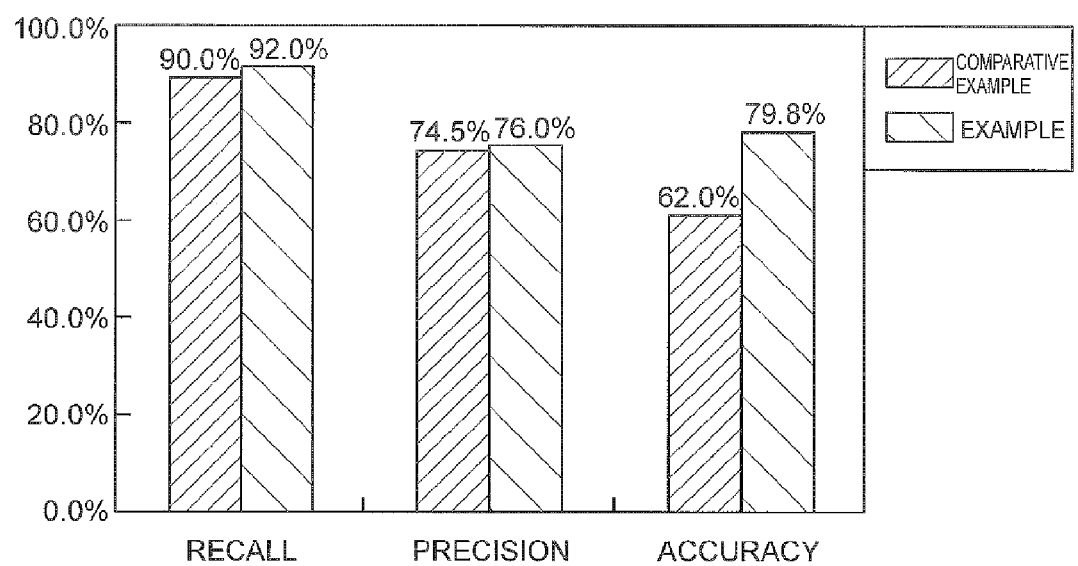
FIG. 12 is a graph showing experimental results in a present example and a comparative example.

FIG. 12 shows the final results. As shown in this graph, the better results were obtained in the example for all of the recall, the precision and the accuracy. Particularly, the accuracy was higher in the example than in the comparative example by 17.8%. In this way, it was shown that the present invention provides more accurate results than the technique according to related art.

According to this embodiment, because an annotation needs to be added only to original sample images, a workload for manually adding an annotation in the learning processing is reduced. In the technique according to related art, an annotation (correct answer) needs to be added to each text letter, which requires a heavy workload. On the other hand, in this embodiment, an annotation needs to be added only to each image, which significantly reduces a workload of a user. Further, a user who gives an annotation does not need to be aware of various patterns such as the type, font, color and size of text drawn, which allows high versatility. This effect is more significant in the case where a user processes a large amount of images (for example, when a user processes an enormous amount of product images in an EC site etc.).

Further, after a user gives an annotation, it is possible to leave the processing to the image processing system 1. Specifically, it is possible to appropriately classify processing targets as shown, for example, in the above-described experimental results, without adjusting various parameters used in the learning device 10 and the detection device 20.

An embodiment of the present invention is described in detail above. However, the present invention is not limited to the above-described embodiment. Various changes and modifications may be made to the present invention without departing from the scope of the invention.

Figure 13:
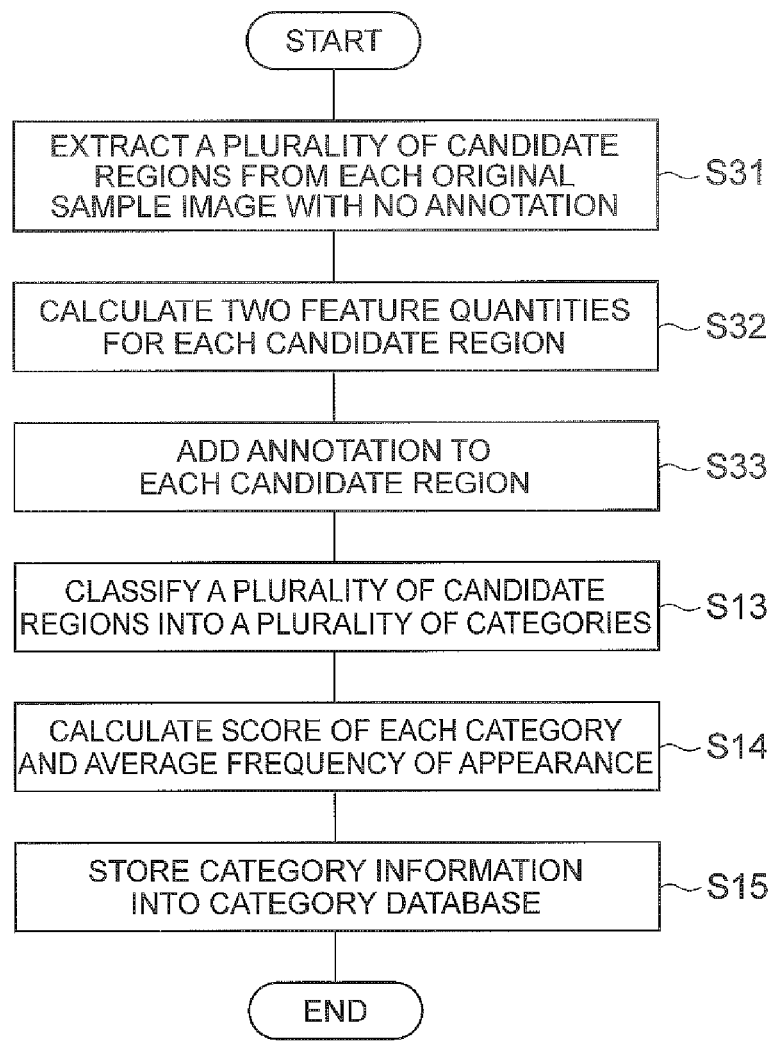
FIG. 13 is a flowchart showing an operation of the image processing system (learning device) according to an alternative example.

Although an annotation is added to original sample images in the above embodiment, an annotation may be added to each candidate region in the learning processing. In this case, as shown in FIG. 13, the first candidate extraction unit 11 extracts a plurality of candidate regions from each original sample image with no annotation (Step S31) and calculates two feature quantities for each of the candidate regions (Step S32, feature quantity calculation step). After this processing, the first candidate extraction unit 11 outputs data about each of the candidate regions in a user-editable format. The user adds an annotation to each of the candidate regions (Step S33), and this input is received by the classification unit 12. The annotation given in this step is information indicating whether each candidate region is a text region. After this input processing is completed, the processing of Steps S13 to S15 is performed in the same manner as in the above embodiment.

In this manner, by adding an annotation to each candidate region, the annotation is set more accurately than in the above embodiment, and therefore the accuracy of the category database 30 is improved and, as a result, the determination in the detection processing becomes more accurate. On the other hand, in this alternative example, a workload for giving an annotation increases. However, the workload is significantly lower compared with the technique according to related art that needs to add an annotation on a letter-by-letter basis.

Although the detection device 20 determines whether an original target image is a text image or a non-text image in the above embodiment, the detection device 20 may determine whether a candidate region extracted from the image is a text region or a non-text region. In other words, the processing target may be an original image or one or more candidate regions that form a part of the original image.

Figure 14:
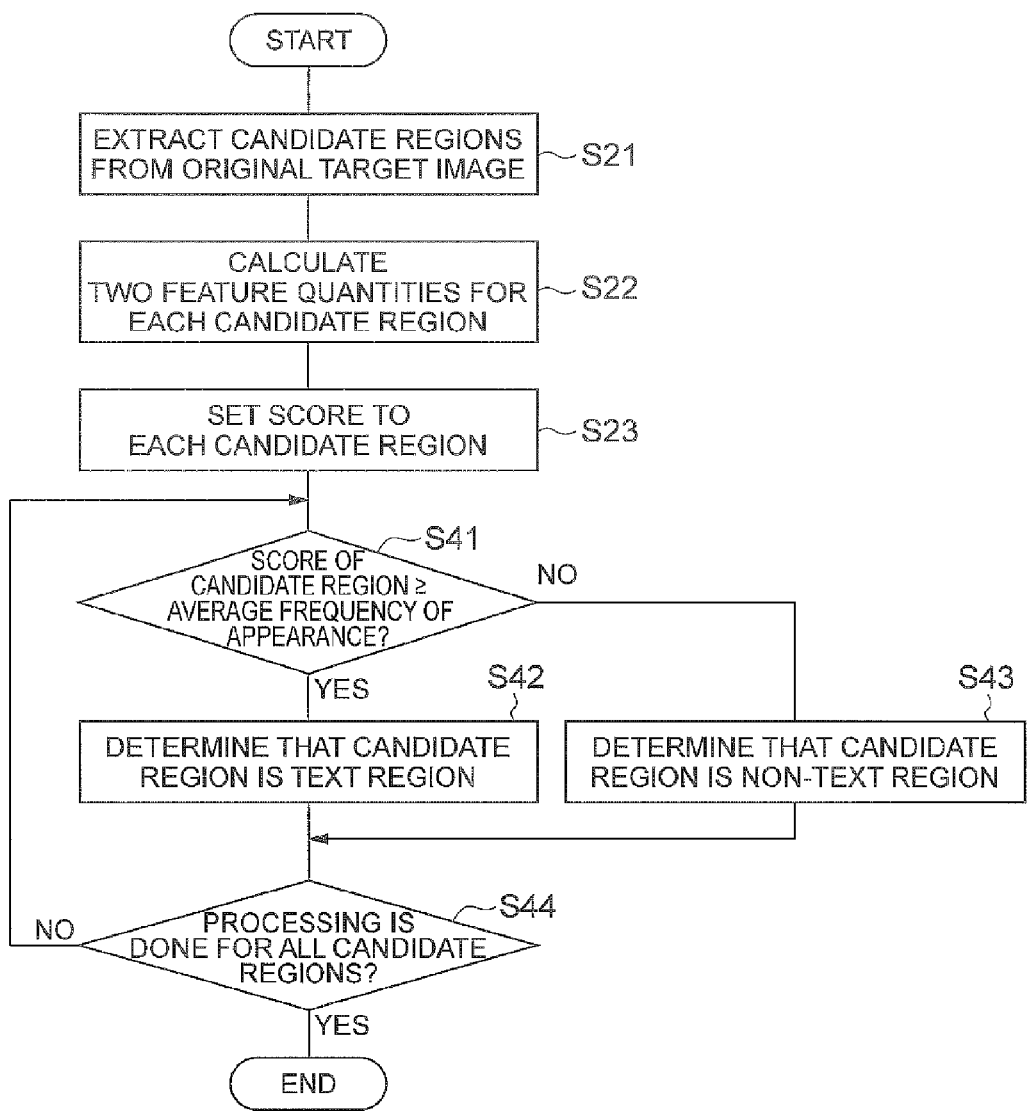
FIG. 14 is a flowchart showing an operation of the image processing system (detection device) according to an alternative example.

This alternative example is specifically described with reference to FIG. 14. First, the processing of Steps S21 to S23 is performed in the same manner as in the above embodiment, and the score P(Cn) is set for each candidate region.

Next, the determination unit 23 performs the following processing for each candidate region. Specifically, when the score of the candidate region is equal to or more than the average frequency of appearance P(T) (YES in Step S41), the determination unit 23 determines that the target region is a text region (Step S42), and when the score is less than the average frequency of appearance P(T) (NO in Step S41), the determination unit 23 determines that the target region is a non-text region (Step S43). The determination unit 23 performs such determination processing for all of the candidate regions (see Step S44). When there are a plurality of original target images, the detection device 20 performs the series of processing steps for each of the original target images.

The learning processing and the detection processing are independent of each other. Thus, whether to add an annotation to an original sample image or to each candidate region in the learning processing does not affect the detection processing. Further, whether to make determination on an original sample image or on each candidate region in the detection processing does not affect the learning processing.

Although the average frequency of appearance is used as the threshold in the detection processing in the above-described embodiment, a numerical value used as the threshold is not limited thereto. For example, the average or median of the scores of all categories may be used as the threshold. Further, the threshold may set so that whether it is a text image or not can be determined most accurately for all of original sample images used for learning. Specifically, the maximum score of candidate regions is specified for each original sample image, and the threshold may be set so that the original sample image having the maximum score that is equal to or more than the threshold is most accurately determined as a text image.

The image processing system 1 may perform the learning processing and the detection processing in consideration of additional attributes such as the genre of a subject product or the provider of an image (for example, a virtual shop). In this case, the learning device 10 classifies original sample images into several groups based on the additional attributes and performs the learning processing for each group and thereby generates the category information of each additional attribute.

FIG. 15 shows an example of category information generated for each additional attribute. In this example, the category information (the number of categories, the category center and the score for each category, and the average frequency of appearance) is generated for each product genre such as "camera".

By taking the additional attributes of an image into consideration, the category information in accordance with the characteristics of a product or a provider can be obtained, and improvement of accuracy of the detection processing can be thereby expected.

Although the category information is used for determination as to whether a processing target contains text or not in the above embodiment, the use of the category information is not limited thereto. The result of the learning processing in the present invention can be used for any image processing. Therefore, the category database 30 and the detection device 20 are not essential elements. In relation to this, the way of outputting the category information in the output unit 14 is also not limited. For example, the output unit 14 may display the category information on a monitor or output it to a printer.

Although the learning device 10, the detection device 20 and the category database 30 are independent of one another in the above-described embodiment, the configuration of the image processing system is not limited thereto. For example, any two of those three elements may be integrated into one device, or all of those elements may be implemented by one device.

After calculating the score P(Cn) of each category in the first processing (the processing described in the above embodiment), the classification unit 12 and the score calculation unit 13 may segment the category including both of candidate regions extracted from a text image and candidate regions extracted from a non-text image into a plurality of categories (which are also referred to as "subcategories" in this specification). The "segmentation" is to classify (reclassify) candidate regions in a category of a processing target into a plurality of subcategories. The segmentation is performed for the purpose of more specifically classifying candidate regions in a category where candidate regions extracted from a text image and candidate regions extracted from a non-text image are mixed about half and half into categories where the frequency of appearance of candidate regions extracted from a text image is high and categories where that frequency of appearance is low. The range of the score P(Cn) of a category to be segmented (which is also referred to as "segmentation range" in this specification) can be set arbitrarily. For example, the lower limit of the segmentation range may be set to be equal to or more than 0.4 and less than 0.5, and the upper limit of the segmentation range may be set to be more than 0.5 and equal to or less than 0.6. To be more specific, the lower limit may be set to 0.4 or 0.45, and the upper limit may be set to 0.55 or 0.6 Alternatively, the segmentation range may not contain 0.5.

Figure 16:
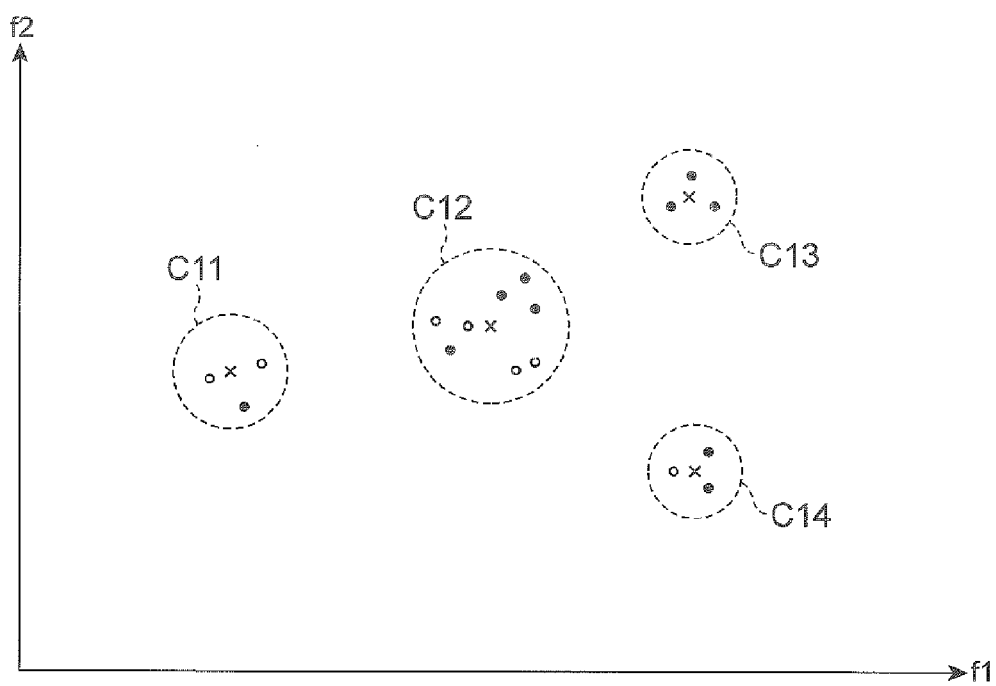
FIG. 16 is a view showing an example of classification of candidate regions according to an alternative example.

The segmentation of categories is described hereinafter with reference to the examples of FIGS. 16 and 17. FIG. 16 shows the state where a plurality of candidate regions are classified into a plurality of categories by the first processing. In FIG. 16, just like in FIG. 6, candidate regions are plotted in a two-dimensional coordinate system having the two features quantities f1 (aspect ratio) and f2 (area ratio) as the coordinate axes. The black circle indicates a candidate region extracted from a text image, and the white circle indicates a candidate region extracted from a non-text image. The regions C11 to C14 on the graph indicate categories. The mark "x" indicates the category center. In the same manner as in the above embodiment, the classification unit 12 normalizes each of the aspect ratio f1 and the area ratio f2 and then classifies a plurality of candidate regions into a plurality of categories by using the k-means method.

The score calculation unit 13 calculates, for each category, the score P(Cn) indicating the frequency of appearance of candidate regions extracted from a text image by using the above equation (2). The scores of the categories C11 to C14 shown in FIG. 16 are as follows.

$C11 = 1/3 \approx 0.33$ $C12 = 4/8 = 0.50$ $C13 = 3/3 = 1.00$ $C14 = 2/3 \approx 0.67$ In this alternative example, the score calculation unit 13 determines whether the segmentation is needed or not for each category. Thus, the score calculation unit 13 stores a segmentation range in advance. In the example of FIG. 16, when it is assumed that the segmentation range is from 0.40 to 0.60, the score calculation unit 13 determines to perform reclassification only for candidate regions in the category C12 whose score is within the above range, and gives an instruction for performing the processing to the classification unit 12. As matter of course, when there are a plurality of categories to be segmented, the score calculation unit 13 gives an instruction for segmenting all of the categories to the classification unit 12. When the score of any category is not within the segmentation range, the score calculation unit 13 outputs the score P(Cn) of each category Cn and the average frequency of appearance P(T) to the output unit 14 in the same manner as in the above embodiment without giving an instruction for performing segmentation to the classification unit 12. Whether or not to segment categories does not affect the value of the average frequency of appearance P(T).

When the classification unit 12 receives the instruction from the score calculation unit 13, it segments processing target categories into a plurality of categories. The classification unit 12 sets the category center of a plurality of subcategories in each of categories to be segmented and make a candidate region belong to the subcategory where the Mahalanobis distance between the category center and the candidate region is the shortest. Therefore, the processing of classifying a certain candidate region into a subcategory is the same as the processing of classifying an unclassified candidate region into a category.

Figure 17:
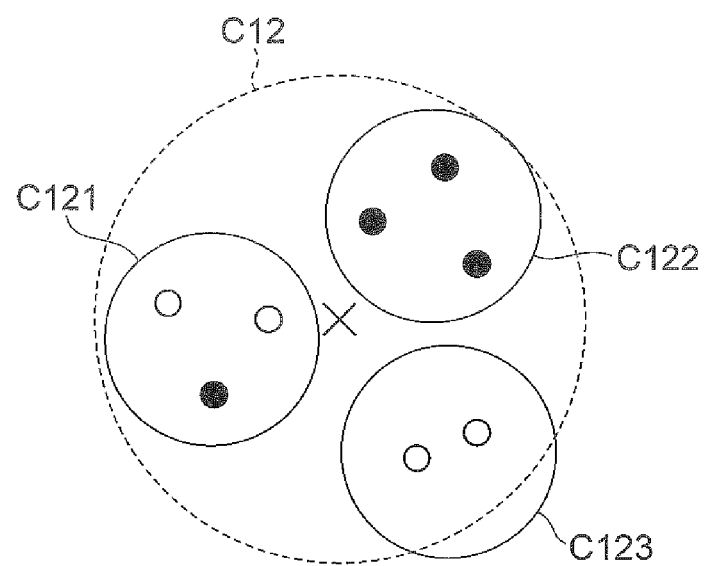
FIG. 17 is a view showing an example of segmentation of one of categories shown in FIG. 16.

FIG. 17 is a view showing one example of segmentation of a category C12 in FIG. 16. In this example, the classification unit 12 reclassifies a plurality of candidate regions in the category C12 into three subcategories C121, C122 and C123.

After the classification unit 12 finishes the segmentation, the score calculation unit 13 calculates the score P(Cn) of each subcategory by using the above equation (2). The scores of the subcategories C121 to C123 shown in FIG. 17 are as follows.

$C121 = 1/3 \approx 0.33$ $C122 = 3/3 = 1.00$ $C123 = 0/2 = 0$

Then, the score calculation unit 13 outputs the score P(Cn) of each category Cn and the average frequency of appearance P(T) to the output unit 14. As described above, whether or not to segment categories does not affect the value of the average frequency of appearance P(T). Note that the "category" is any one of a category generated in the first processing or a category (subcategory) generated in the segmentation processing. In the subsequent processing including the detection processing, whether the category is generated in the first processing or generated in the segmentation processing is not taken into consideration, and it is thus not necessary to add such information to the category information in the category database 30. As a matter of course, if needed, information indicating whether the category is a subcategory (whether it is obtained by the segmentation processing) may be added to the category information.

The classification unit 12 and the score calculation unit 13 may repeatedly perform the above-described segmentation processing until there is no category whose score is within the segmentation range. In this case, it is possible to specifically set the characteristics (whether the frequency of appearance of candidate regions extracted from a text image is high or low in the category) of each category.

Alternatively, the upper limit of the number of times of performing the segmentation processing may be set (for example, only once, twice, or five times). In this case, while the processing can be aborted even when a category whose score is within the segmentation range remains, it is possible to more specifically set the characteristics of each category while suppressing a calculation load on the learning device 10.

In any way, with such segmentation, the characteristics of each category are obtained more specifically, and it is thereby possible to more accurately detect a text region in an image.

The segmentation of categories in the learning processing can be applied to both of the case where an annotation is added to an original sample image and the case where an annotation is added to each candidate region. In the case where an annotation is added to each candidate region, the classification unit 12 and the score calculation unit 13 segment categories including both of candidate regions to which an annotation indicating that it is a text region is added and candidate regions to which an annotation indicating that it is a text region is not added (in other words, candidate regions to which an annotation indicating that it is not a text region is added) into a plurality of categories.

REFERENCE SIGNS LIST

1 . . . image processing system, 10 . . . learning device, 11 . . . first candidate extraction unit, 12 . . . classification unit, 13 . . . score calculation unit, 14 . . . output unit, 20 . . . detection device, 21 . . . second candidate extraction unit (determination unit), 22 . . . score setting unit (determination unit), 23 . . . determination unit, 30 . . . category database, P . . . image processing program, P1 . . . learning program, P10 . . . main module, P11 . . . first candidate extraction module, P12 . . . classification module, P13 . . . score calculation module, P14 . . . output module, P2 . . . detection program, P20 . . . main module, P21 . . . second candidate extraction module, P22 . . . score setting module, P23 . . . determination module

The invention claimed is:

1. An image processing system comprising:
  at least one memory operable to store computer program code;
  at least one processor operable to access said at least one memory, read said program code, and operate as instructed by said program code, said program code including:
    feature quantity calculation code configured to cause at least one of said at least one processor to calculate a feature quantity for each of a plurality of candidate regions extracted as a candidate for a text region from a plurality of original sample images, the plurality of original sample images including one or more text images containing a text region and including one or more non-text images not containing a text region;
    classification code configured to cause at least one of said at least one processor to classify the plurality of candidate regions into a plurality of categories based on the feature quantity, an annotation indicating which of the text image and the non-text image the candidate region is extracted from being added to each candidate region;
    score calculation code configured to cause at least one of said at least one processor to calculate, for each category, a score indicating a frequency of appearance of the candidate region to which the annotation indicating extraction from the text image is added; and
    output code configured to cause at least one of said at least one processor to output the score of each category as category information.

2. The image processing system according to claim 1, wherein
  the score calculation code is further configured to cause at least one of said at least one processor to calculate a proportion of the number of candidate regions extracted from the text image in one category as the score.

3. The image processing system according to claim 2, wherein
  the classification code is further configured to cause at least one of said at least one processor to reclassify the candidate regions included in the category including candidate regions extracted from the text image and candidate regions extracted from the non-text image into a plurality of categories, and
  the score calculation code is further configured to cause at least one of said at least one processor to calculate a proportion of the number of candidate regions extracted from the text image as the score, for each of the plurality of categories generated by the reclassification.

4. The image processing system according to claim 1, wherein
  the annotation is added to each of the original sample images, and
  the feature quantity calculation code is further configured to cause at least one of said at least one processor to add the annotation added to the original sample image from which the candidate region is extracted, to the candidate region.

5. An image processing system comprising:
  at least one memory operable to store computer program code;
  at least one processor operable to access said at least one memory, read said program code, and operate as instructed by said program code, said program code including:
    feature quantity calculation code configured to cause at least one of said at least one processor to calculate a feature quantity for each of a plurality of candidate regions extracted as a candidate for a text region from at least one original sample image;
    classification code configured to cause at least one of said at least one processor to classify the plurality of candidate regions into a plurality of categories based on the feature quantity, an annotation indicating whether the candidate region is a text region being added to each candidate region;
    score calculation code configured to cause at least one of said at least one processor to calculate, for each category, a score indicating a frequency of appearance of the candidate region to which the annotation indicating the text region is added; and
    output code configured to cause at least one of said at least one processor to output the score of each category as category information.

6. The image processing system according to claim 5, wherein
  the score calculation code is further configured to cause at least one of said at least one processor to calculate a proportion of the number of candidate regions to which the annotation indicating the text region is added in one category as the score.

7. The image processing system according to claim 6, wherein
  the classification code is further configured to cause at least one of said at least one processor to reclassify the candidate regions included in the category including candidate regions to which the annotation indicating the text region is added and candidate regions to which the annotation indicating the text region is not added, into a plurality of categories, and
  the score calculation code is further configured to cause at least one of said at least one processor to calculate a proportion of the number of candidate regions to which the annotation indicating the text region is added as the score, for each of the plurality of categories generated by the reclassification.

8. The image processing system according to claim 1, wherein
  the classification code is further configured to cause at least one of said at least one processor to set a plurality of category centers based on the feature quantity and associate the candidate region with the category where a distance between the feature quantity of the candidate region and the category center is shortest.

9. The image processing system according to claim 1, wherein
  the feature quantity is an aspect ratio of the candidate region and an area ratio of a part determined as the text region.

10. The image processing system according to claim 1, wherein an additional attribute indicating a genre of a subject or a provider of the original sample image is associated with each original sample image, the feature quantity calculation code, the classification code and the score calculation code are configured to cause at least one of the at least one processor to sort the plurality of original sample images into groups based on the additional attribute and perform processing for each group, and the output code is further configured to cause at least one of said at least one processor to output the category information of each group.

11. The image processing system according to claim 1, further comprising:

determination code configured to cause at least one of said at least one processor to determine, based on the category information, whether an original target image being a processing target contains a text region.

12. The image processing system according to claim 11, wherein the determination code is configured to cause at least one of said at least one processor to calculate the feature quantity for each of a plurality of candidate regions extracted from the original target image containing the processing target, specify the category to which each candidate region belongs, and determine whether the original target image contains a text region based on a highest score among a plurality of scores corresponding to the plurality of candidate regions.

13. The image processing system according to claim 1, further comprising:

determination code configured to cause at least one of said at least one processor to determine, based on the category information, whether the candidate region extracted as a candidate for a text region from a processing target image is a text region.

14. The image processing system according to claim 11, wherein the determination code is further configured to cause at least one of said at least one processor to calculate the feature quantity for each of a plurality of candidate regions extracted from the original target image containing the processing target, specify the category to which each candidate region belongs, and determine, for each candidate region, whether the candidate region is a text region based on a score corresponding to the candidate region.

15. The image processing system according to claim 10, further comprising:

determination code configured to cause at least one of said at least one processor to determine whether a processing target having the additional attribute contains a text region based on the category information corresponding to the additional attribute.

16. An image processing method performed by at least one computer processor, comprising:

calculating a feature quantity for each of a plurality of candidate regions extracted as a candidate for a text region from a plurality of original sample images, the plurality of original sample images including one or more text images containing a text region and including one or more non-text images not containing a text region;

classifying the plurality of candidate regions into a plurality of categories based on the feature quantity, an annotation indicating which of the text image and the non-text image the candidate region is extracted from being added to each candidate region;

calculating, for each category, a score indicating a frequency of appearance of the candidate region to which the annotation indicating extraction from the text image is added; and outputting the score of each category as category information.

17. An image processing method performed by at least one computer processor, comprising:

calculating a feature quantity for each of a plurality of candidate regions extracted as a candidate for a text region from at least one original sample image;

classifying the plurality of candidate regions into a plurality of categories based on the feature quantity, an annotation indicating whether the candidate region is a text region being added to each candidate region;

calculating, for each category, a score indicating a frequency of appearance of the candidate region to which the annotation indicating the text region is added; and outputting the score of each category as category information.

18. A non-transitory computer-readable recording medium storing an image processing program causing a computer to:

calculate a feature quantity for each of a plurality of candidate regions extracted as a candidate for a text region from a plurality of original sample images, the plurality of original sample images including one or more text images containing a text region and including one or more non-text images not containing a text region;

classify the plurality of candidate regions into a plurality of categories based on the feature quantity, an annotation indicating which of the text image and the non-text image the candidate region is extracted from being added to each candidate region;

calculate, for each category, a score indicating a frequency of appearance of the candidate region to which the annotation indicating extraction from the text image is added; and output the score of each category as category information.

19. A non-transitory computer-readable recording medium storing an image processing program causing a computer to:

calculate a feature quantity for each of a plurality of candidate regions extracted as a candidate for a text region from at least one original sample image;

classify the plurality of candidate regions into a plurality of categories based on the feature quantity, an annotation indicating whether the candidate region is a text region being added to each candidate region;

calculate, for each category, a score indicating a frequency of appearance of the candidate region to which the annotation indicating the text region is added; and output the score of each category as category information.

* * * * *